(12) United States Patent
Dexheimer et al.

(10) Patent No.: US 6,436,867 B1
(45) Date of Patent: Aug. 20, 2002

(54) ONE-STEP SYNTHESIS OF DOUBLE METAL CYANIDES

(75) Inventors: Edward Michael Dexheimer, Grosse Ile, MI (US); Georg Heinrich Grosch, Bad Dürkheim (DE)

(73) Assignee: BASF Corporation, Mt. Olive, NJ (US)

( * ) Notice: Subject to any disclaimer, the term of this patent is extended or adjusted under 35 U.S.C. 154(b) by 60 days.

(21) Appl. No.: 09/629,692

(22) Filed: Aug. 1, 2000

(51) Int. Cl.⁷ .................................................. B01J 27/26
(52) U.S. Cl. ........................ 502/175; 502/200; 423/364
(58) Field of Search .................. 502/175, 200; 423/364

(56) References Cited

U.S. PATENT DOCUMENTS

| | | |
|---|---|---|
| 4,477,589 A | 10/1984 | van der Hulst et al. |
| 5,470,813 A | 11/1995 | Le-Khac |
| 5,639,705 A | 6/1997 | Bowman et al. |
| 5,693,584 A | 12/1997 | Le-Khac |
| 5,714,639 A | 2/1998 | Bowman et al. |

FOREIGN PATENT DOCUMENTS

| | | |
|---|---|---|
| WO | 0172418 | 10/2001 |

OTHER PUBLICATIONS

PCT Search Report for WO 01/72418, International Publication Date Oct. 4, 2001; International Application No. PCT/EP01/03498.

*Primary Examiner*—Elizabeth D. Wood
(74) *Attorney, Agent, or Firm*—Fernando A. Borrego

(57) ABSTRACT

An improved method for synthesizing a double metal cyanide (DMC) catalyst is disclosed. The method combines an aqueous solution of a first metal salt, such as $ZnCl_2$, with an aqueous solution of a second metal salt, such as $CoCl_2$, and with an aqueous solution of an alkali metal cyanide, such as KCN, in a single step to synthesize the DMC catalyst, $Zn_3[Co(CN)_6]_2$.

50 Claims, No Drawings

ONE-STEP SYNTHESIS OF DOUBLE METAL CYANIDES

FIELD OF THE INVENTION

The subject invention relates generally to a method of synthesizing a double metal cyanide (DMC) catalyst by combining an aqueous solution of a first metal salt with an aqueous solution of a second metal salt and with an aqueous solution of an alkali metal cyanide in a single step to synthesize the DMC catalyst. More specifically, the subject invention preferably combines an aqueous solution of $ZnCl_2$, as the first metal salt, with an aqueous solution of $CoCl_2$, as the second metal salt, and with an aqueous solution of KCN, as the alkali metal cyanide, to synthesize the DMC catalyst.

BACKGROUND OF THE INVENTION

Polyether polyols are integral intermediate components utilized to manufacture a wide array of products, including polyurethanes. As such, the production of polyether polyols is critical. It is known in the art that polyether polyols are produced from the polymerization of epoxides, such as propylene oxide (PO) and ethylene oxide (EO). It is also known in the art that double metal cyanide (DMC) catalysts are effective catalysts for the polymerization of the epoxides. DMC catalysts produce polyether polyols having narrow molecular weight distributions as well as relatively low unsaturation.

In conventional methods, DMC catalysts are prepared by combining an aqueous solution of a metal salt and an aqueous solution of a complex metal cyanide salt. As a specific example, an aqueous solution of $ZnCl_2$ (excess), as the metal salt, is combined with an aqueous solution of $K_3Co(CN)_6$, as the complex metal cyanide salt. This combination precipitates out the desired DMC catalyst, in this case specifically $Zn_3[Co(CN)_6]_2$. Examples of such conventional methods are disclosed in U.S. Pat. Nos. 5,470,813 and 5,714,639. These conventional methods, in one form or another, utilize a complex metal cyanide salt. The complex metal cyanide salts are very expensive which limits the economic viability of utilizing DMC catalysts in the production of polyether polyols.

Thus, it would be desirable to provide a method of synthesizing DMC catalysts that does not utilize expensive complex metal cyanide salts as intermediates thereby improving the economic viability of DMC catalysts utilized in the production of polyether polyols.

SUMMARY OF THE INVENTION

According to the present invention, a method of synthesizing a double metal cyanide (DMC) catalyst is provided. As disclosed above, the method of the subject invention does not utilize complex metal cyanide salts to synthesize the DMC catalyst.

The method of the subject invention, in a single step, combines an aqueous solution of a first metal salt of the general formula $M(X)_n$ wherein M is selected from the group consisting of aluminum, zinc, and the transition metals; X is an anion selected from the group consisting of halides, hydroxides, sulfates, carbonates, cyanides, oxalates, thiocyanates, isocyanates, isothiocyanates, carboxylates, and nitrates; and n is a value from 1 to 3 satisfying the valency state of M with an aqueous solution of a second metal salt of the general formula $N(Y)_n$ wherein N is selected from the group consisting of the transition metals and the lanthanides; Y is an anion selected from the group consisting of halides, hydroxides, sulfates, carbonates, cyanides, oxalates, thiocyanates, isocyanates, isothiocyanates, carboxylates, and nitrates; and n is a value from 1 to 3 satisfying the valency state of N; and with an aqueous solution of an alkali metal cyanide, such as KCN, to synthesize the DMC catalyst. Thus, the DMC catalyst is produced independent of the complex metal cyanide salt.

In a preferred embodiment of the subject invention, the method combines an aqueous solution of a first metal salt having the same general formula as above wherein M is more specifically selected from the group consisting of Al(III) and Zn(II); X is an anion more specifically selected from the group consisting of halides; and n is a value from 1 to 3 satisfying the valency state of M with an aqueous solution of a second metal salt having the same general formula as above wherein N is more specifically selected from the group consisting of the Fe(II), Fe(III), Co(II), and Co(III); Y is an anion more specifically selected from the group consisting of halides; and n is a value from 1 to 3 satisfying the valency state of N; and with an aqueous solution of an alkali metal cyanide in a single step to synthesize the DMC catalyst.

Finally, in a further preferred embodiment of the subject invention, the method of synthesizing the DMC catalyst combines an aqueous solution of $ZnCl_2$ with an aqueous solution of $CoCl_2$ and with an aqueous solution of KCN in a single step. It is to be understood that in alternative embodiments of the subject invention $ZnCl_2$ may be substituted with $Zn(OAc)_2$, namely zinc acetate.

DETAILED DESCRIPTION OF A PREFERRED EMBODIMENT

A method of synthesizing a double metal cyanide (DMC) catalyst is disclosed. More specifically, the method of the subject invention synthesizes the DMC catalyst by combining aqueous solutions of a first metal salt, a second metal salt, and an alkali metal cyanide in a single step to synthesize the catalyst.

An aqueous solution of the first metal salt is prepared. The aqueous solution of the first metal salt can range from 1 to 50 parts by weight of the first metal salt based on 100 parts by weight of the aqueous solution. Similarly, aqueous solutions of a second metal salt and an alkali metal cyanide are also prepared. These aqueous solutions can also range from 1 to 50 parts by weight of the second metal salt and the alkali metal cyanide, respectively, based on 100 parts by weight of the aqueous solution. Additionally, the aqueous solutions of the first metal salt, the second metal salt, and the alkali metal cyanide may include an organic activator as discussed below.

The first metal salt of the subject invention observes the general formula $M(X)_n$. In this formula, it is to be understood that M is selected from the group consisting of aluminum, zinc, and the transition metals, X is an anion selected from the group consisting of halides, hydroxides, sulfates, carbonates, cyanides, oxalates, thiocyanates, isocyanates, isothiocyanates, carboxylates, and nitrates, and n is a value from 1 to 3 satisfying the valency state of M. In the preferred embodiment of the subject invention, M is selected from the group consisting of Al(III) and Zn(II), X is selected from the group consisting of halides, and n is a value from 1 to 3 satisfying the valency state of M. The first metal salt of the subject invention may also be $Zn(OAc)_2$. Most preferably, the first metal salt of the subject invention is $ZnCl_2$.

The second metal salt of the subject invention observes the general formula $N(Y)_n$. In this formula, it is to be understood that N is selected from the group consisting of the transition metals and the lanthanides, Y is an anion selected from the group consisting of halides, hydroxides, sulfates, carbonates, cyanides, oxalates, thiocyanates, isocyanates, isothiocyanates, carboxylates, and nitrates, and n is a value from 1 to 3 satisfying the valency state of N. In the preferred embodiment of the subject invention, N is selected from the group consisting of the Fe(II), Fe(III), Co(II), and Co(III), Y is selected from the group consisting of halides, and n is a value from 1 to 3 satisfying the valency state of N. Most preferably, the second metal salt of the subject invention is $CoCl_2$.

It is understood that Group IA alkali metals may be utilized for the alkali metal cyanide of the subject invention. Preferably, the alkali metal cyanide utilized is KCN. However, it is to be understood that other alkali metal cyanides, such as LiCN and NaCN, may be utilized without varying the scope of the subject invention.

In one embodiment, the method of the subject invention first combines the aqueous solution of $M(X)_n$ and the aqueous solution of $N(Y)_n$ to establish a first aqueous solution. The first aqueous solution, including the aqueous solutions of both the first metal salt, $M(X)_n$, and the second metal salt, $N(Y)_n$, is combined with the aqueous solution of the alkali metal cyanide, such as an aqueous solution of KCN, to form a combination product. Alternatively, all three aqueous solutions can be combined in a single step.

Next, the combination product is filtered to collect a residual product. The residual product is triturated with a water-soluble organic activator. More specifically, the water soluble organic activator is selected from the group consisting of ethanol, isopropyl alcohol, n-butyl alcohol, sec-butyl alcohol, tert-butyl alcohol, isobutyl alcohol, and mixtures thereof. Preferably, the water soluble organic activator is tert-butyl alcohol. Finally, the residual product is dried, preferably air-dried, thus isolating the DMC catalyst.

The following examples illustrate the nature of the subject method invention with regard to the synthesis of the DMC catalyst. The examples presented herein are intended to demonstrate the objects of the invention but should not be considered as limitations thereto.

EXAMPLES

The method synthesizes the DMC catalyst in a single step according to the following chemical equation:

The aqueous solution of the first metal salt, $ZnCl_2$, is combined with the aqueous solution of the second metal salt, $CoCl_2$, and with the aqueous solution of the alkali metal cyanide, KCN, in a single step to synthesize the DMC catalyst, $Zn_3[Co(CN)_6]_2$.

Although not shown, KCl is produced as a secondary product according to the above chemical equation. It is understood that KCl deactivates the DMC catalyst such that the DMC catalyst is ineffective in polymerizing epoxides, such as PO, to produce a polyether polyol. As such, it is critical that any amounts of the secondary product KCl are minimized, if not completely eliminated, through the filtering and the triturating steps discussed above.

In a second example, the method synthesizes an alternative DMC catalyst in a single step according to the following chemical equation:

The aqueous solution of the first metal salt, $ZnCl_2$, is combined with the aqueous solution of the second metal salt, $FeCl_3$, and with the aqueous solution of the alkali metal cyanide, KCN, in a single step to synthesize the DMC catalyst, $Zn_3[Fe(CN)_6]_2$. The above discussion regarding the secondary product KCl also applies in this example.

More specifically, in this example, an aqueous solution of the first metal salt was prepared with 0.45 g $ZnCl_2$ and 10.0 g $H_2O$. An aqueous solution of the second metal salt was prepared with 0.54 g $FeCl_3.6H_2O$, and an aqueous solution of the alkali metal cyanide was prepared with 0.78 g KCN and 20 g $H_2O$ and 1.0 g tert-butyl alcohol. Next, the aqueous solution of $ZnCl_2$ was combined with the aqueous solution of $FeCl_3.6H_2O$ to establish the first aqueous solution of the subject invention. The first aqueous solution was then combined with the aqueous solution of KCN to complete the synthesis of the combination product $Zn_3[Fe(CN)_6]_2$.

Procedure to Extract the DMC Catalyst $Zn_3[Fe(CN)_6]_2$

The combination of the first aqueous solution with the aqueous solution of KCN resulted in the immediate formation of the combination of a black precipitate in solution. This entire combination of the black precipitate and the solution was filtered, and triturated with a solution of 5.0 g $H_2O$ and 5.0 g tert-butyl alcohol, and then filtered again to collect a residual product. The residual product was then transferred to a beaker and allowed to air-dry. The resulting combination product of $Zn_3[Fe(CN)_6]_2$ weighed 0.42 g.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims the invention may be practiced otherwise than as specifically described.

What is claimed is:

1. A method of synthesizing a double metal cyanide (DMC) catalyst, said method comprising the steps of:

combining an aqueous solution of a first metal salt of the general formula $M(X)_n$ wherein;

M is selected from the group consisting of aluminum, zinc, and the transition metals, X is an anion selected from the group consisting of halides, hydroxides, sulfates, carbonates, cyanides, oxalates, thiocyanates, isocyanates, isothiocyanates, carboxylates, and nitrates, and n is a value from 1 to 3 satisfying the valency state of M;

with an aqueous solution of a second metal salt of the general formula $N(Y)_n$ wherein;

N is selected from the group consisting of the transition metals and the lanthanides, Y is an anion selected from the group consisting of halides, hydroxides, sulfates, carbonates, cyanides, oxalates, thiocyanates, isocyanates, isothiocyanates, carboxylates, and nitrates, and n is a value from 1 to 3 satisfying the valency state of N; and with an aqueous solution of an alkali metal cyanide in a single step to synthesize the DMC catalyst;

filtering the combination product of the aqueous solutions of the first metal salt, the second metal salt, and the alkali metal cyanide to collect a residual product; and triturating the residual product with a water-soluble organic activator comprising ethanol, isopropyl alcohol, n-butyl alcohol, sec-butyl alcohol, tert-butyl alcohol, and isobutyl alcohol.

2. A method as set forth in claim 1 wherein the alkali metal cyanide is selected from the group consisting of KCN, LiCN, and NaCN.

3. A method as set forth in claim 1 wherein the step of combining is further defined by first combining the aqueous solution of $M(X)_n$ and the aqueous solution of $N(Y)_n$ to establish a first aqueous solution.

4. A method as set forth in claim 3 wherein the step of combining is further defined by combining the first aqueous solution with the aqueous solution of the alkali metal cyanide.

5. A method as set forth in claim 1 further including the step of drying the residual product.

6. A method as set forth in claim 1 wherein the aqueous solutions of the first metal salt, the second metal salt, and the alkali metal cyanide are from 1 to 50 parts by weight based on 100 parts by weight of the aqueous solution.

7. A method as set forth in claim 1 wherein the aqueous solutions of the first metal salt, the second metal salt, and the alkali metal cyanide further include tert-butyl alcohol.

8. A method of synthesizing a double metal cyanide (DMC) catalyst, said method comprising the steps of:

combining an aqueous solution of a first metal salt of the general formula $M(X)_n$ wherein;
M is selected from the group consisting of Al(III) and Zn(II),
X is an anion selected from the group consisting of halides, and
n is a value from 1 to 3 satisfying the valency state of M;

with an aqueous solution of a second metal salt of the general formula $N(Y)_n$ wherein;
N is selected from the group consisting of the Fe(II), Fe(III), Co(II), and Co(III),
Y is an anion selected from the group consisting of halides, and
n is a value from 1 to 3 satisfying the valency state of N; and with an aqueous solution of an alkali metal cyanide in a single step to synthesize the DMC catalyst;

filtering the combination product of the aqueous solutions of the first metal salt, the second metal salt, and the alkali metal cyanide to collect a residual product; and triturating the residual product with a water-soluble organic ethanol, n-propyl alcohol, isopropyl alcohol, n-butyl alcohol, sec-butyl alcohol, tert-butyl alcohol, and isobutyl alcohol.

9. A method as set forth in claim 8 wherein the alkali metal cyanide is selected from the group consisting of KCN, LiCN, and NaCN.

10. A method as set forth in claim 8 wherein the step of combining is further defined by first combining an aqueous solution of $M(X)_n$ and an aqueous solution of $N(Y)_n$ to establish a first aqueous solution.

11. A method as set forth in claim 10 wherein the step of combining is further defined by combining the first aqueous solution with the aqueous solution of the alkali metal cyanide.

12. A method as set forth in claim 8 further including the step of drying the residual product.

13. A method as set forth in claim 8 wherein the aqueous solutions of the first metal salt, the second metal salt, and the alkali metal cyanide are from 1 to 50 parts by weight based on 100 parts by weight of the aqueous solution.

14. A method as set forth in claim 8 wherein the aqueous solutions of the first metal salt, the second metal salt, and the alkali metal cyanide further include tert-butyl alcohol.

15. A method of synthesizing a double metal cyanide (DMC) catalyst, said method comprising the steps of:

combining an aqueous solution of $ZnCl_2$;
with an aqueous solution of $CoCl_2$; and
with an aqueous solution of KCN in a single step to synthesize the DMC catalyst;

filtering the combination product of the aqueous solutions of the $ZnCl_2$, the $CoCl_2$, and the KCN to collect a residual product; and triturating the residual product with a water-soluble organic activator comprising ethanol, n-propyl alcohol, isopropyl alcohol, n-butyl alcohol, sec-butyl alcohol, tert-butyl alcohol, and isobutyl alcohol.

16. A method as set forth in claim 15 wherein the step of combining is further defined by first combining an aqueous solution of $M(X)_n$ and an aqueous solution of $N(Y)_n$ to establish a first aqueous solution.

17. A method as set forth in claim 16 wherein the step of combining is further defined by combining the first aqueous solution with the aqueous solution of KCN.

18. A method as set forth in claim 15 further including the step of drying the residual product.

19. A method as set forth in claim 15 wherein the aqueous solutions of the first metal salt, the second metal salt, and the KCN are from 1 to 50 parts by weight based on 100 parts by weight of the aqueous solution.

20. A method as set forth in claim 15 wherein the aqueous solutions of the first metal salt, the second metal salt, and the KCN further include tert-butyl alcohol.

21. A method of synthesizing a double metal cyanide (DMC) catalyst, said method comprising the steps of:

combining an aqueous solution of a first metal salt of the general formula $M(X)_n$ wherein;
M is selected from the group consisting of aluminum, zinc, and the transition metals,
X is an anion selected from the group consisting of halides, hydroxides, sulfates, carbonates, cyanides, oxalates, thiocyanates, isocyanates, isothiocyanates, carboxylates, and nitrates, and
n is a value from 1 to 3 satisfying the valency state of M;

with an aqueous solution of a second metal salt of the general formula $N(Y)_n$ wherein;
N is selected from the group consisting of the transition metals and the lanthanides,
Y is an anion selected from the group consisting of halides, hydroxides, sulfates, carbonates, cyanides, oxalates, thiocyanates, isocyanates, isothiocyanates, carboxylates, and nitrates, and
n is a value from 1 to 3 satisfying the valency state of N; and with an aqueous solution of an alkali metal cyanide in a single step to synthesize the DMC catalyst wherein a secondary product that deactivates the DMC catalyst is also synthesized; and substantially eliminating the secondary product from the combination product of the aqueous solutions of the first metal salt, the second metal salt, and the alkali metal cyanide such that the DMC catalyst is not deactivated.

22. A method as set forth in claim 21 wherein the step of substantially eliminating the secondary product includes the step of filtering the combination product of the aqueous solutions of the first metal salt, the second metal salt, and the alkali metal cyanide to collect a residual product.

23. A method as set forth in claim 22 wherein the step of substantially eliminating the secondary product further includes the step of triturating the residual product with a water-soluble organic activator comprising ethanol, isopropyl alcohol, n-butyl alcohol, sec-butyl alcohol, tert-butyl alcohol, and isobutyl alcohol.

24. A method as set forth in claim 22 further including the step of drying the residual product.

25. A method as set forth in claim 21 wherein the alkali metal cyanide is selected from the group consisting of KCN, LiCN, and NaCN.

26. A method as set forth in claim 25 wherein the secondary product that is substantially eliminated from the combination product is selected from the group consisting of KCl, LiCl, and NaCl.

27. A method as set forth in claim 21 wherein the alkali metal cyanide comprises KCN and the secondary product comprises KCl.

28. A method as set forth in claim 21 wherein the step of combining is further defined by first combining the aqueous solution of $M(X)_n$ and the aqueous solution of $N(Y)_n$ to establish a first aqueous solution.

29. A method as set forth in claim 28 wherein the step of combining is further defined by combining the first aqueous solution with the aqueous solution of the alkali metal cyanide.

30. A method as set forth in claim 21 wherein the aqueous solutions of the first metal salt, the second metal salt, and the alkali metal cyanide are from 1 to 50 parts by weight based on 100 parts by weight of the aqueous solution.

31. A method as set forth in claim 21 wherein the aqueous solutions of the first metal salt, the second metal salt, and the alkali metal cyanide further include tert-butyl alcohol.

32. A method of synthesizing a double metal cyanide (DMC) catalyst, said method comprising the steps of:
combining an aqueous solution of a first metal salt of the general formula $M(X)_n$ wherein;
M is selected from the group consisting of Al(III) and Zn(II),
X is an anion selected from the group consisting of halides, and
n is a value from 1 to 3 satisfying the valency state of M;
with an aqueous solution of a second metal salt of the general formula $N(Y)_n$ wherein;
N is selected from the group consisting of the Fe(II), Fe(III), Co(II), and Co(III),
Y is an anion selected from the group consisting of halides, and
n is a value from 1 to 3 satisfying the valency state of N; and
with an aqueous solution of an alkali metal cyanide in a single step to synthesize the DMC catalyst wherein a secondary product that deactivates the DMC catalyst is also synthesized; and
substantially eliminating the secondary product from the combination product of the aqueous solutions of the first metal salt, the second metal salt, and the alkali metal cyanide such that the DMC catalyst is not deactivated.

33. A method as set forth in claim 32 wherein the step of substantially eliminating the secondary product includes the step of filtering the combination product of the aqueous solutions of the first metal salt, the second metal salt, and the alkali metal cyanide to collect a residual product.

34. A method as set forth in claim 33 wherein the step of substantially eliminating the secondary product further includes the step of triturating the residual product with a water-soluble organic activator comprising ethanol, isopropyl alcohol, n-butyl alcohol, sec-butyl alcohol, tert-butyl alcohol, and isobutyl alcohol.

35. A method as set forth in claim 33 further including the step of drying the residual product.

36. A method as set forth in claim 32 wherein the alkali metal cyanide comprises KCN and the secondary product comprises KCl.

37. A method of synthesizing a double metal cyanide (DMC) catalyst, said method comprising the steps of:
combining an aqueous solution of $ZnCl_2$;
with an aqueous solution of $CoCl_2$; and
with an aqueous solution of KCN in a single step to synthesize the DMC catalyst wherein a secondary product that deactivates the DMC catalyst is also synthesized; and
substantially eliminating the secondary product from the combination product of the aqueous solutions of the $ZnCl_2$, the $CoCl_2$, and the KCN such that the DMC catalyst is not deactivated.

38. A method as set forth in claim 37 wherein the step of substantially eliminating the secondary product further includes the step of filtering the combination product of the aqueous solutions of $ZnCl_2$, the $CoCl_2$, and the KCN to collect a residual product.

39. A method as set forth in claim 38 wherein the step of substantially eliminating the secondary product further includes the step of triturating the residual product with a water-soluble organic activator comprising ethanol, isopropyl alcohol, n-butyl alcohol, sec-butyl alcohol, tert-butyl alcohol, and isobutyl alcohol.

40. A method as set forth in claim 38 further including the step of drying the residual product.

41. A method as set forth in claim 37 wherein the secondary product comprises KCl.

42. A method of synthesizing a double metal cyanide (DMC) catalyst, said method comprising the step of:
combining an aqueous solution of a first metal salt of the general formula $M(X)_n$ wherein;
M is selected from the group consisting of aluminum, zinc, and the transition metals,
X is an anion selected from the group consisting of halides, hydroxides, sulfates, carbonates, cyanides, oxalates, thiocyanates, isocyanates, isothiocyanates, carboxylates, and nitrates, and
n is a value from 1 to 3 satisfying the valency state of M;
with an aqueous solution of a second metal salt of the general formula $N(Y)_n$ wherein;
N is selected from the group consisting of the transition metals and the lanthanides,
Y is an anion selected from the group consisting of halides, hydroxides, sulfates, carbonates, cyanides, oxalates, thiocyanates, isocyanates, isothiocyanates, carboxylates, and nitrates, and
n is a value from 1 to 3 satisfying the valency state of N; and
with an aqueous solution of an alkali metal cyanide in a single step to synthesize the DMC catalyst.

43. A method as set forth in claim 42 wherein the alkali metal cyanide is selected from the group consisting of KCN, LiCN, and NaCN.

44. A method as set forth in claim 42 wherein the step of combining is further defined by first combining the aqueous solution of $M(X)_n$ and the aqueous solution of $N(Y)_n$ to establish a first aqueous solution.

45. A method as set forth in claim 44 wherein the step of combining is further defined by combining the first aqueous solution with the aqueous solution of the alkali metal cyanide.

46. A method as set forth in claim 44 further including the step of filtering the combination product of the aqueous solutions of the first metal salt, the second metal salt, and the alkali metal cyanide to collect a residual product.

47. A method as set forth in claim 46 further including the step of triturating the residual product with a water-soluble organic activator comprising ethanol, isopropyl alcohol, n-butyl alcohol, sec-butyl alcohol, tert-butyl alcohol, and isobutyl alcohol.

48. A method as set forth in claim 46 further including the step of drying the residual product.

49. A method as set forth in claim 42 wherein the aqueous solutions of the first metal salt, the second metal salt, and the alkali metal cyanide are from 1 to 50 parts by weight based on 100 parts by weight of the aqueous solution.

50. A method as set forth in claim 42 wherein the aqueous solutions of the first metal salt, the second metal salt, and the alkali metal cyanide further include tert-butyl alcohol.

* * * * *